United States Patent
Ugolini

(10) Patent No.: US 9,659,506 B2
(45) Date of Patent: May 23, 2017

(54) APPARATUS, SYSTEM, AND METHOD FOR TEACHING MULTIPLICATION

(71) Applicant: Leigh Ugolini, Lake Geneva, WI (US)

(72) Inventor: Leigh Ugolini, Lake Geneva, WI (US)

(*) Notice: Subject to any disclaimer, the term of this patent is extended or adjusted under 35 U.S.C. 154(b) by 280 days.

(21) Appl. No.: 14/632,946

(22) Filed: Feb. 26, 2015

(65) Prior Publication Data
US 2015/0243188 A1 Aug. 27, 2015

Related U.S. Application Data

(60) Provisional application No. 61/945,658, filed on Feb. 27, 2014.

(51) Int. Cl.
*G09B 19/02* (2006.01)
*G09B 23/00* (2006.01)

(52) U.S. Cl.
CPC ............. *G09B 19/02* (2013.01); *G09B 23/00* (2013.01)

(58) Field of Classification Search
CPC .......... G09B 19/00; G09B 19/02; G09B 1/34; G09B 23/00
USPC .................................. 434/188, 209
See application file for complete search history.

(56) References Cited

U.S. PATENT DOCUMENTS

| | | | | |
|---|---|---|---|---|
| 4,269,597 A | * | 5/1981 | Green | G09B 19/02 434/198 |
| 4,445,865 A | * | 5/1984 | Sellon | G09B 19/02 434/207 |
| 6,716,033 B1 | * | 4/2004 | Lassowsky | G09B 1/34 434/191 |
| 2005/0255432 A1 | * | 11/2005 | Packter | A47G 33/00 434/245 |
| 2006/0087110 A1 | * | 4/2006 | Polick | G09B 1/22 281/15.1 |

* cited by examiner

*Primary Examiner* — James Hull
(74) *Attorney, Agent, or Firm* — Scherrer Patent & Trademark Law, P.C.; Stephen T. Scherrer; Monique A. Morneault

(57) ABSTRACT

The present invention relates to an apparatus, system, and method for teaching mathematics. Specifically, the present invention relates to a system and method for helping students solve advance multiplication problems and teaching students how to perform the same. Even more specifically, a student may use the present invention to cover up confusing numbers and isolating a single digit for multiplication. The present invention provides students with a space for providing the solution to the single digit multiplication. Further, the present invention allows a student to shift to a different single digit for multiplication without becoming confused with the previously solved multiplications.

10 Claims, 4 Drawing Sheets

APPARATUS, SYSTEM, AND METHOD FOR TEACHING MULTIPLICATION

The present invention claims priority under 35 U.S.C. 119 to U.S. Provisional Pat. App. No. 61/945,658, titled "Apparatus, System, and Method for Teaching Multiplication," filed Feb. 27, 2014, which is incorporate herein by reference in its entirety.

TECHNICAL FIELD

The present invention relates to an apparatus, system, and method for teaching mathematics, namely multiplication. Specifically, the present invention relates to a system and method for helping students solve advanced multiplication problems and teaching students how to perform the same.

BACKGROUND

The subject of mathematics has been taught for thousands of years. Generally, each teacher uses his or her own method of teaching the different aspects of mathematics. Commonly the method the teacher uses is often the method the teacher learned as a student. This can be detrimental as outdated, obsolete, and inefficient methods of teaching may continue for generations.

Usually, each student has his or her own style of learning. Some general learning styles are, but not limited to, visual learning, tactile learning, and auditory learning. Visual learners absorb information with their eyes through reading, viewing, and reflecting on visual cues. Tactile learners absorb information thorough manipulation, experience, and actually performing what is to be learned. Auditory learners absorb information with their ears by listening to lectures, rhythms, tones, and other sound patterns. Of course many other learning styles exist.

Commonly, teachers use many different methods to adjust to different learning styles. Teachers can lecture to their students, write what they are lecturing on a board or screen, and explain the lecture material through examples. In this way teachers can attempt to encompass most learning styles.

Sometimes, students can become overwhelmed by the amount of material presented even if it is presented in the students' particular learning style. This could be large scale, as in the amount of topics presented, or small scale, as in the number of steps, variables, or numerals required to perform a particular problem or task. To ease a student's learning, when a student is overwhelmed on a large scale, the student can be taught one topic at a time, for example. Similarly, to ease a student's learning, when a student is overwhelmed on a small scale, the student can focus on one step, variable, or numeral at a time.

In mathematics, and specifically in the study of multiplication, students may be overwhelmed by the sheer number of digits, numerals and steps required to obtain an answer, especially an answer that is many digits long. A need, therefore, exists for an apparatus, system, and method for focusing on one step, variable, or numeral at a time in a multiplication problem.

Often, solving problems requires performing a series of steps in a particular order. Even when students focus on one step at a time, they may lose track of what step they are on or the order of the steps. Moreover, a need exists for an apparatus, system, and method for easily identifying a series of steps and a particular order of steps in a multiplication problem.

Commonly, students learn through repetition. The more a student is exposed to a material, the more likely the student will learn the material. This is another reason why teachers may use boards and examples to supplement their lectures. Usually, students are given homework that includes a plurality of similar problems to further expose students to repetitive steps. Additionally, a need exists for an apparatus, system, and method that use repetitive steps in a multiplication problem. Moreover, a need exists for an apparatus, system, and method that utilize boards to teach the series of steps so that a plurality of students may learn at the same time.

SUMMARY OF THE INVENTION

The present invention relates to an apparatus, system, and method for teaching mathematics, namely multiplication. Specifically, the present invention relates to a system and method for helping students solve advanced multiplication problems and teaching students how to perform the same as a series of individual and discrete steps. Even more specifically, a student may use the present invention to cover up confusing numbers and isolate a single digit for multiplication. The present invention provides students with a space for disclosing the solution to the single digit multiplication. Further, the present invention allows a student to shift to a different single digit for multiplication without becoming confused with the previously solved multiplications.

To this end, in an embodiment of the present invention, a multiplication aid apparatus is provided. The multiplication aid apparatus comprises a main body portion having a first arm, wherein the first arm has a first space for isolating a first digit in a first number, and a second arm disposed below the first arm, wherein the second arm bendably reveals a second space.

In an alternate embodiment of the present invention, a system of teaching mathematics is provided. The system comprises a multiplication problem having a first number and a second number, wherein the second number has at least a tens digit, and a multiplication aid apparatus having a first arm and a second arm disposed below the first arm, wherein the first arm of the multiplication aid apparatus is positioned over the second number such that only one digit is shown.

In an alternate embodiment of the present invention, a method of teaching mathematics is provided. The method comprises the steps of providing a system for teaching mathematics that comprises a multiplication problem having a first number and a second number, wherein the second number has at least a tens digit, and a multiplication aid apparatus having a first arm and a second arm disposed below the first arm, wherein the first arm is positioned over the second number such that a first digit is shown, bending the second arm to reveal a space, and shifting the multiplication aid apparatus to show a second digit.

It is, therefore, an advantage and objective of the present invention to provide an apparatus, system, and method that focuses on one step, variable, or numeral at a time in a multiplication problem.

Moreover, it is an advantage and objective of the present invention to provide an apparatus, system, and method that easily identifies the series of steps and the particular order of steps in a multiplication problem.

Additionally, it is an advantage and objective of the present invention to provide an apparatus, system, and method that uses repetitive steps in a multiplication problem.

Moreover, it is an advantage and objective of the present invention to provide an apparatus, system, and method that utilize boards to teach the series of steps so that a plurality of students may learn at the same time.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an apparatus, system, and method for teaching mathematics, namely multiplication. Specifically, the present invention relates to a system and method for helping students solve advanced multiplication problems and teaching students how to perform the same. Even more specifically, a student may use the present invention to cover up confusing numbers and isolating a single digit for multiplication. The present invention provides students with a space for providing the solution to the single digit multiplication. Further, the present invention allows a student to shift to a different single digit for multiplication without becoming confused with the previously solved multiplications.

Figure 1:
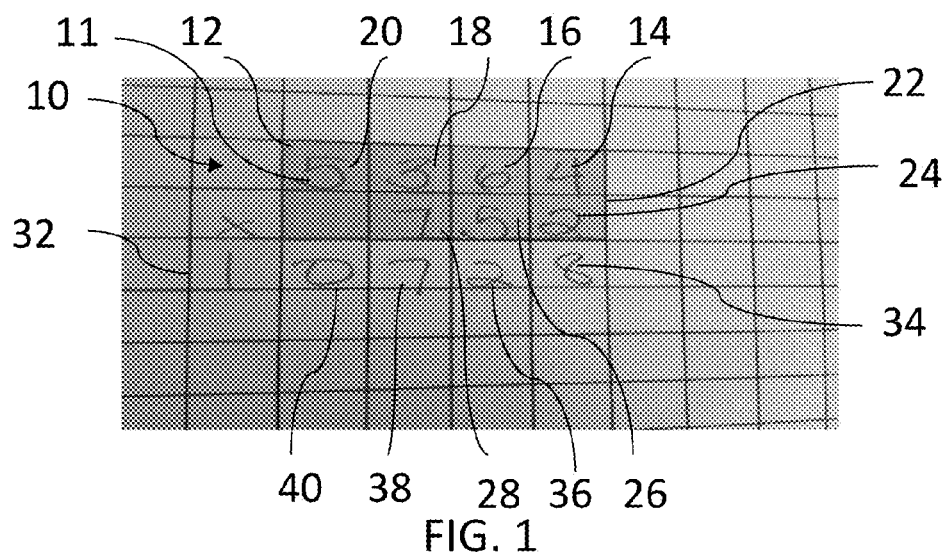
FIG. 1 illustrates a multiplication problem on a sample of graph paper, showing the solution of multiplication of the ones digit in an embodiment of the present invention.

Now referring to the figures, wherein like numerals refer to like parts, FIGS. 1-4 show a multiplication problem as an example only, including utilization of a multiplication aid apparatus 50, in an embodiment of the present invention. Specifically, FIG. 1 shows a common multiple digit multiplication problem on a sample of graph paper 10. A first number 12 may be multiplied by a second number 22 to find the solution 32. To aid a user in multiplication and where to place the numbers, the first number 12 and the second number 22 may be written or otherwise disposed within a shaded section 11 of the sample of graph paper 10. The first number 12 may have a number of digits such as a "ones" digit 14, a "tens" digit 16, a "hundreds" digit 18, and a "thousands" digit 20. Of course, any number of digits may be used in a multiplication problem and the present invention should not be limited to the particular multiplication problem disclosed herein.

The second number 22 may similarly have a "ones" digit 24, a "tens" digit 26, and a "hundreds" digit 28. In order to multiple the first number 12 by the second number 22, each digit may be focused on. First, the ones digit 24 of the second number 22 may be multiplied by the ones digit 14 of the first number 12. A ones digit 34 of the solution 32 may be placed below the ones digits 14, 24. Next, the ones digit 24 of the second number 22 may be multiplied by the tens digit 16 of the first number 12. A tens digit 36 of the solution 32 may be place below the tens digits 16, 26. Next, the ones digit 24 of the second number 22 may be multiplied by the hundreds digit 18 of the first number 12. A hundreds digit 38 of the solution 32 may be place below the hundreds digits 18, 28. Lastly, the ones digit 24 of the second number 22 may be multiplied by the thousands digit 20 of the first number 12. A thousands digit 40 of the solution 32 may be placed below the thousands digit 20.

Of course any solution digit greater than one digit would have its additional digits carried above. In the example provided by FIG. 1, the tens digit 36 of the solution 32 was "2" and a "1" was carried over because "2"×"6" is "12." In the case of a carried over digit, that digit is added to the respective digit of the solution. In this way, multiplication of the first number 12 can be multiplied by the ones digit 24 of the second number 22.

Figure 2:
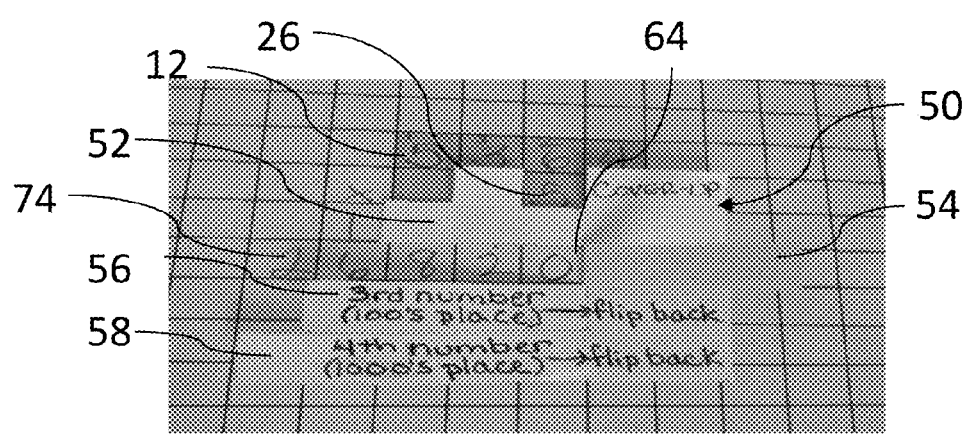
FIG. 2 illustrates a multiplication aid apparatus disposed on a sample of graph paper showing a multiplication problem in accordance with an embodiment of the present invention.
Figure 3:
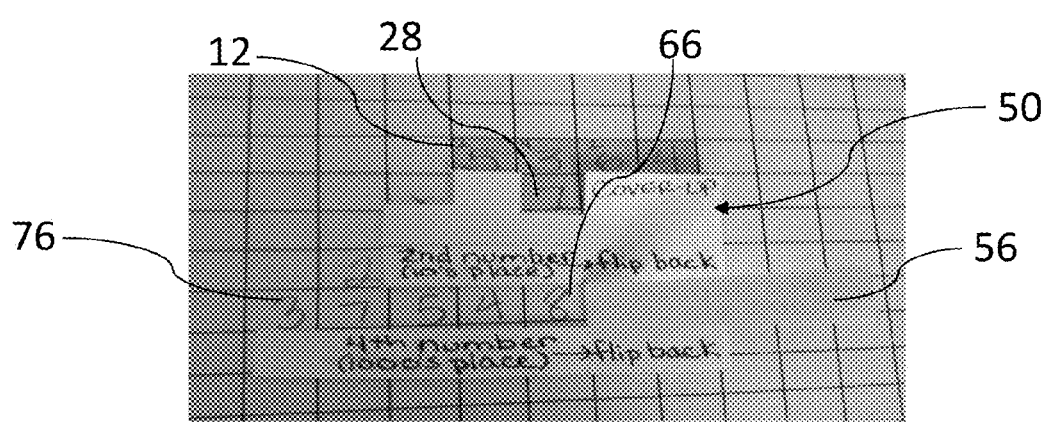
FIG. 3 illustrates a multiplication aid apparatus disposed on a sample of graph paper showing a multiplication problem in accordance with an embodiment of the present invention

The multiplication aid apparatus 50 is shown and described in FIGS. 2-3. The multiplication aid apparatus 50 may have a block 52 and a plurality of arms 54, 56, 58. The multiplication aid apparatus 50 may be disposed on top of the multi digit multiplication problem on the sample of graph paper 10 to focus a student's attention on a particular digit. For example, the multiplication aid apparatus 50 may be positioned to block out the thousands, hundreds, tens, and/or ones digit of a number. The multiplication aid apparatus 50 may also block out any previously calculated solutions and allow only a single digit to be seen and focused on by a user thereof.

The block 52 may be disposed around a single digit of the second number 22. The other digits of the second number 22 may be effectively removed from the problem by hiding the same behind the multiplication aid apparatus 50 and may allow a student or user to focus on the single digit of the second number 22. For example, the tens digit 26 of the second number 22 may be focused upon when the block 52 is disposed around the tens digit 26 of the second number 22. Of course, the block 52 may be disposed around the ones digit 24 of the second number 22 allowing a student to proceed through the multiplication as described above, or the block 52 may be disposed around the hundreds digit 28 as shown in FIG. 3. In fact, the block 52 may be disposed around any digit without departing from the spirit and scope of the present invention. The block 52 may further be disposed over the solution 32, such that the digits of the solution 32 do not interfere with the student's or user's concentration.

Figure 4:
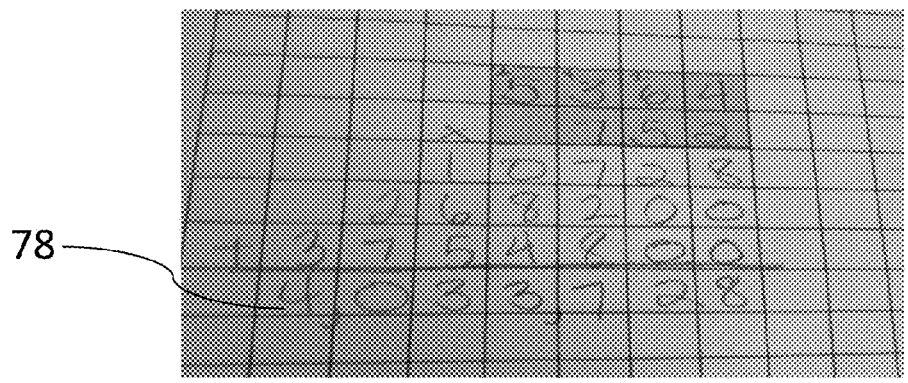
FIG. 4 illustrates a multiplication problem on a sample of graph paper, showing the entire solution of the multiplication problem in accordance with an embodiment of the present invention.

The plurality of arms 54, 56, 58 may be independently bendable such that a plurality of spaces 64, 66, 68 is respectively formed upon bending or folding the arms upwardly and out of the way. Within the spaces 64, 66, 68 a student or user may transcribe a solution 74, 76 of the first number 12 multiplied by a single digit of the second number 22. Specifically, arm 54 may bend or fold revealing space 64 that may be filled with the solution 74 of the first number 12 multiplied by the tens digit 26 of the second number 22. Arm 56 may bend or fold revealing space 66 that may be filled with the solution 76 of the first number 12 multiplied by the hundreds digit 28 of the second number 22 as shown in FIG. 3. Arm 58 may bend or fold revealing space 68 that may be filled with a solution 78. The solution 78 may be the first number 12 multiplied by a thousands digit of the second number 22, or may be the complete solution, as shown in FIG. 4, when the second number 22 does not have a thousands digit. Additionally, the plurality of arms 54, 56, 58 may have a plurality of lengths such that they cover the respective spaces 64, 66, 68 and solutions 74, 76, 78. Of course, the multiplication aid apparatus 50 may have any number of arms and spaces for solutions as necessary to complete multiplication problems more advanced than the one shown and described by the figures.

The multiplication aid apparatus 50 shown and described above may be used to help students or other users learn how to multiply multi digit numerals. Using FIGS. 1-4 as an example only, a multiplication problem is shown. The multiplication problem requires multiplying the first number 12 ("5324" in FIG. 1) by the second number 22 ("752" in FIG. 1). As described above, a student or user can multiply the ones' digit 24 of the second number 22 ("2" in FIG. 1) by the first number 12 ("5324" in FIG. 1). The result of this multiplication gives the solution 32 ("10728" in FIG. 1). As shown in FIG. 2, the multiplication aid apparatus 50 may be placed on the multiplication problem, covering the hundreds' digit 28 and ones' digits 24 of the second number 22. This may expose only the tens digit 26 ("5" in FIG. 2) of the second number 22. From here, the student or user may easily multiply the first number 12 ("5364" in FIG. 2) by the tens digit 26 ("5" in FIG. 2) of the second number 22. The student or user may bend, flip, or otherwise move arm 54 and expose space 64 for transcribing the solution 74 ("26820" in FIG. 2) therein, as shown by FIG. 2. The student or user may then cover space 64 with arm 54 and merely shift the multiplication aid apparatus 50 left to the next digit, or the hundreds digit 28 ("7" in FIG. 3) of the second number 22. From here, the student or user may easily multiply the first number 12 ("5364" in FIG. 3) by the hundreds' digit 28 ("7" in FIG. 3) of the second number 22. The student or user may bend, flip, or otherwise move arm 56 and expose space 66 for transcribing the solution 76 ("37548" in FIG. 3) therein, as shown by FIG. 3. For this example, the student or user is done with the multiplication steps. However, additional multiplication steps may be necessary for multiplication of numbers with additional digits. As shown in FIG. 4, the student or user may remove the multiplication aid apparatus 50 and fill in any empty columns with zeros. Specifically, the solution 74 ("26820" in FIG. 2) would need an additional zero to its right ("268200" in FIG. 4) and the solution 76 ("37548" in FIG. 3) would need two additional zeros to its right ("3754800" in FIG. 4). Now, the student or user merely must add each column together, adding "10728," "268200," and "3754800." The student may then transcribe the solution 78 ("4033728" in FIG. 4).

Therefore, the multiplication aid apparatus 50 may allow a student to focus on a single multiplication digit as she or he solves the multiplication problem, lessening several confusing aspects of advanced multiplication. With repetition and using the multiplication aid apparatus 50, the student will become better proficient in advanced multiplication, and eventually will no longer require use of the multiplication aid apparatus 50.

The multiplication aid apparatus, as disclosed herein, may be any size. For example, the multiplication aid apparatus 50 may be relatively small, to be utilized by an individual student on a standard piece of paper. To aid in the usage of the multiplication aid apparatus 50, the student may utilize the multiplication aid apparatus 50 with specifically sized graph paper, having individual cells that may be sized appropriately for use with the multiplication aid apparatus 50. Likewise, them multiplication aid apparatus of the present invention may be relatively larger, and may be utilized by an instructor to demonstrate advanced multiplication techniques, as described herein, so that a plurality of students may learn at the same time.

Figure 5:
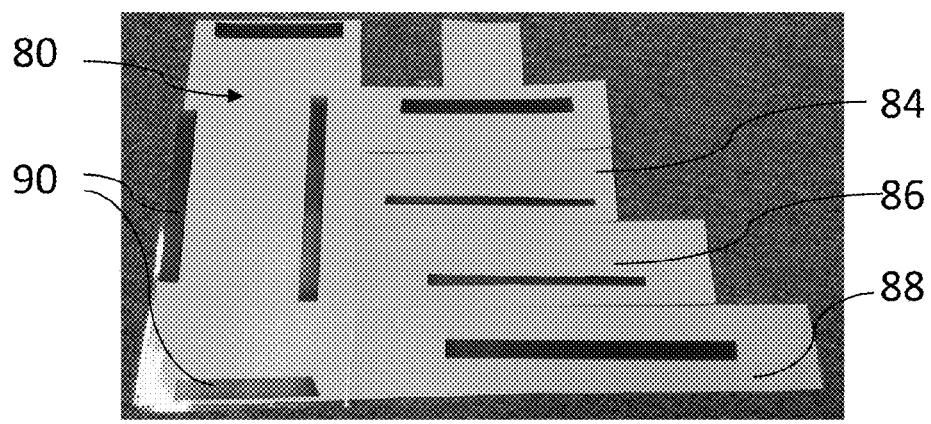
FIG. 5 illustrates a backside view of a multiplication aid apparatus for use with a magnetic board in an alternate embodiment of the present invention.
Figure 6:
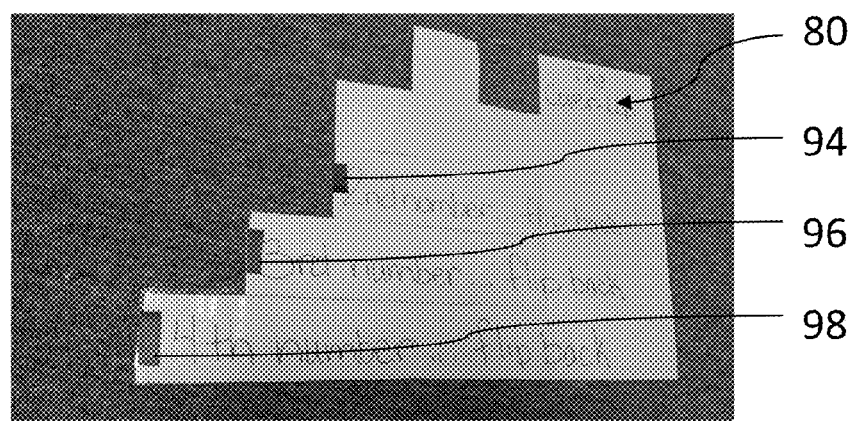
FIG. 6 illustrates a front side view of a multiplication aid apparatus for use with a magnetic board in an alternate embodiment of the present invention.

Specifically, in another embodiment of the present invention, a relatively large multiplication aid apparatus 80 may have a plurality of linking devices 90 as shown in FIGS. 5-6. The plurality of linking devices 90 may be magnets, suction cups, hook and loop fasteners, mushroom shaped fasteners, sticky tack, or other linking device known to one skilled in the art. The plurality of linking devices 90 may be disposed on a back of the multiplication aid apparatus 80, on the back of a block 82 (equivalent to the block 52, as described above), and on the back of each of the plurality of arms 84, 86, 88 (equivalent to the plurality of arms 54, 56, 58, as described above) as shown in FIG. 5 for displaying the multiplication aid apparatus 80 on a vertical surface. Additionally, the plurality of linking devices 94, 96, 98 may be disposed on the front and at one end of each of the plurality of arms 84, 86, 88 as shown in FIG. 6.

The linking device 94 may be used to hold arm 84 in place when arm 84 is bent or folded when disposed on a surface. Similarly, the linking device 96 may be used to hold arm 86 in place when arm 86 is bent or folded. Finally, the linking device 98 may be used to hold arm 88 in place when arm 88 is bent or folded. The plurality of linking devices 90, 94, 96, 98 may therefore aid in teaching both how to do multiplication and how to use the multiplication aid apparatus 80.

The multiplication aid apparatus 80 may be utilized in a similar, if not identical, manner as the multiplication aid apparatus 50, describe in detail above. In a non-limiting example, the multiplication aid apparatus 80 may have a plurality of magnets as linking devices, and the multiplication aid apparatus 80 may be disposed on a vertical magnetic board, such as a standard dry-erase magnetic board. Therefore, a teacher may display a multiplication problem on the magnetic board, and the multiplication aid apparatus 80 may be used to help solve the multiplication problem. The plurality of magnets may hold the multiplication aid apparatus 80 in place when disposed on the magnetic board, in place over the respective digits allowing a user to utilize the same to solve the multiplication problem. Therefore, when a row is revealed by bending or folding one of the arms 84, 86, 88, the magnets in the arms 84, 86, 88 may hold the arms in place as the multiplication aid apparatus is being used.

Therefore, a teacher may utilize the multiplication aid apparatus 80 to demonstrate to a plurality of students the use thereof, and the solving of the multiplication problem disposed on a magnetic board. As noted above, the linking devices may be any that may allow the multiplication aid apparatus to be utilized on a vertical surface on a relatively large scale. For example, the linking devices may be adhesive, and the vertical surface may be a chalkboard. Of course, it should be noted that the multiplication aid apparatus, the size thereof, the kind and quantity of linking devices, the number of arms, and other like parameters may be changed without diminishing the scope of the present invention, and the present invention should not be limited as specifically described herein.

Figure 7:
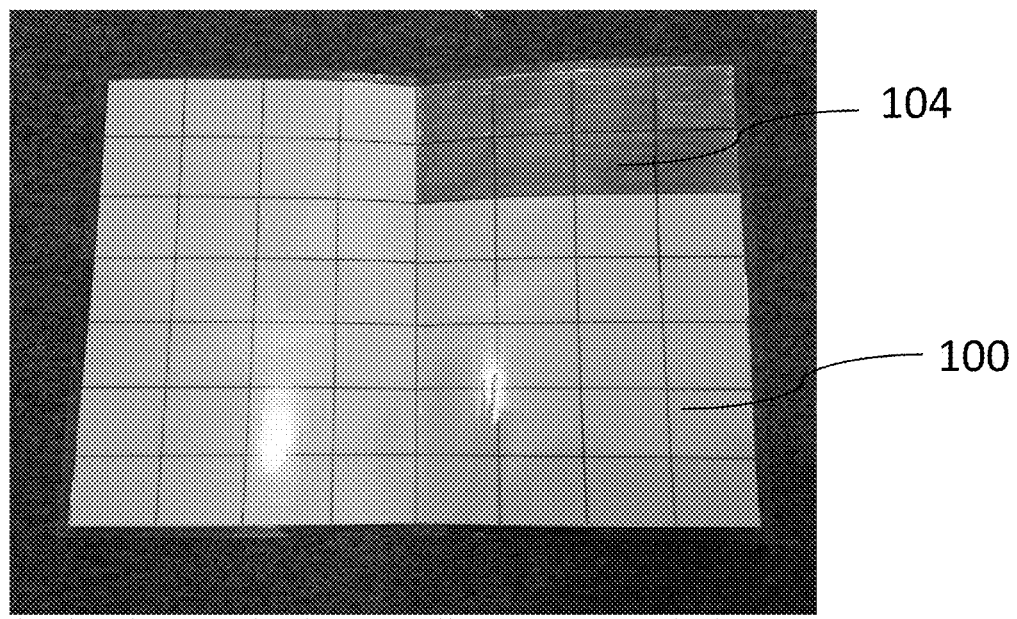
FIG. 7 illustrates a laminated graph paper for use with a multiplication aid apparatus in an alternate embodiment of the present invention.
Figure 8:
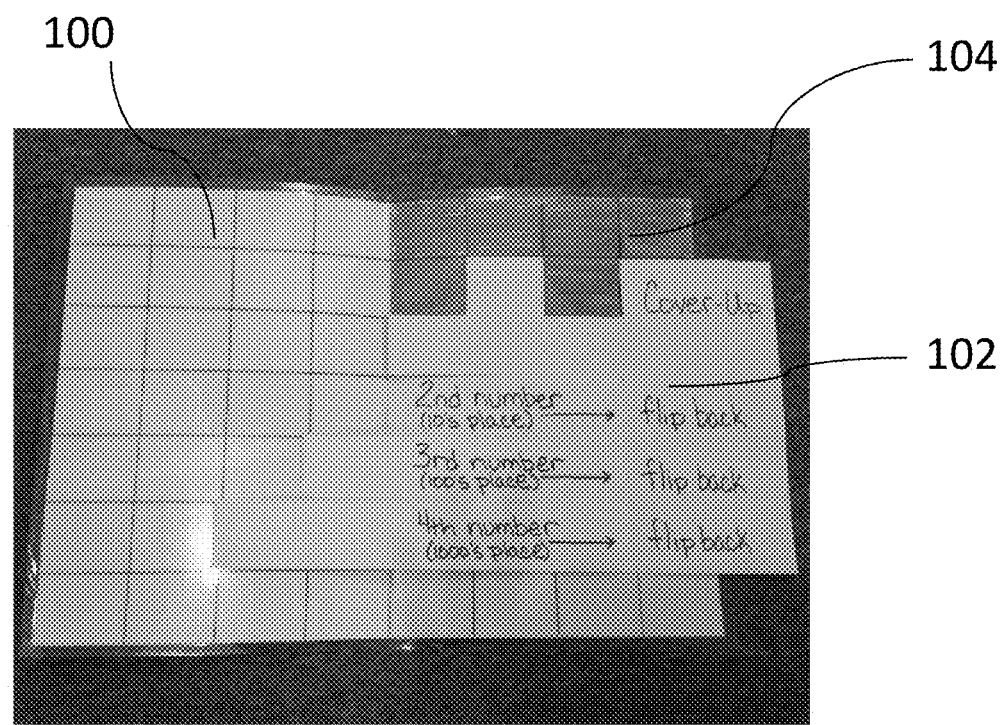
FIG. 8 illustrates a multiplication aid apparatus on a laminated graph paper in an alternate embodiment of the present invention.

Referring now to FIG. 7, an alternate embodiment of the present invention is illustrated. Specifically, a laminated graph paper 100 is shown for use with a multiplication aid apparatus 102, as disclosed above and shown in more detail in FIG. 8. The laminated graph paper 100 may have a plurality of squares 104 shaded so that a user may utilize the shaded squares 104 in the same or similar manner as disclosed above with reference to FIG. 1, by writing or otherwise disposing a plurality of numbers to be multiplied together. The multiplication aid apparatus 102 may be utilized as disclosed above to aid a user in multiplying the numbers together. Because the laminated graph paper 100 is laminated, it may be utilized with a removable marking device, such as a dry-erase marker or the like, for utilization repeatedly with different numbers in the shaded section. Moreover, the laminated graph paper 100 may be protected from elements, such as moisture or other like elements that may otherwise damage paper.

Of course, graph shown on the laminated graph paper 100 may be incorporated onto any surface for use in aiding in multiplication, such as on a dry-erase board, a magnetic board (as disclosed above with referenced to FIGS. 5 and 6, a screen, or the like. In addition, the multiplication aid apparatus 102 may also be made of any material, such as paper, wood, metal, plastic or other like materials, as apparent to one of ordinary skill in the art.

Figure 9:
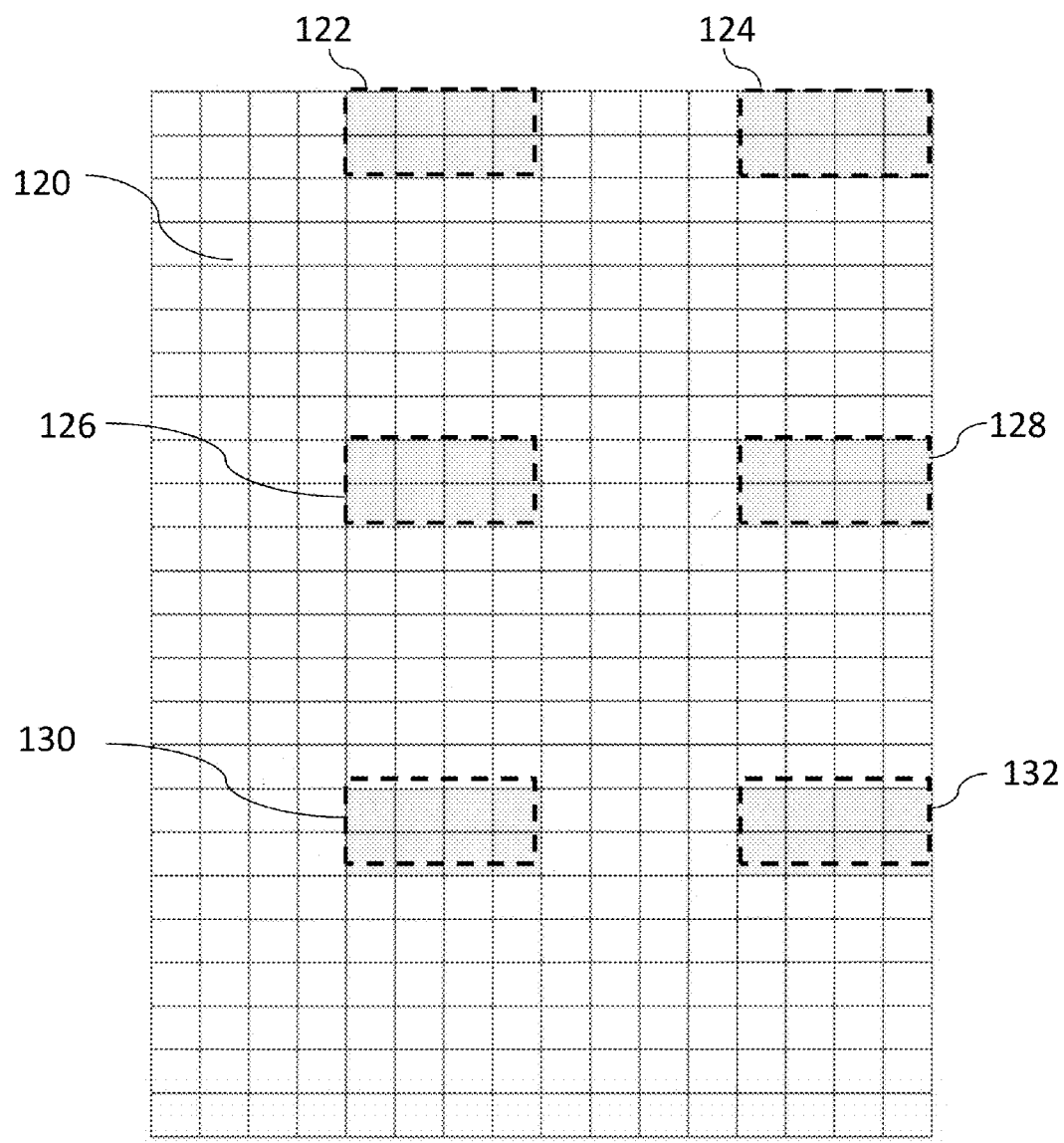
FIG. 9 illustrates a sample of graph paper with shaded areas for use with a multiplication aid apparatus in an alternate embodiment of the present invention.

FIG. 9 illustrates a sample of graph paper 120 that may be utilized with a multiplication aid apparatus of the present invention. On the sample of graph paper 120 may be a plurality of shaded areas 122, 124, 126, 128, 130 and 132 (shown within the dashed lines), each of which may be utilized to solve a different multiplication problem. The multiplication problems may be, for example, written, typed, or otherwise disposed within the shaded areas 122-132 for solving thereof by a student. Thus, a student may have a plurality of multiplication problems to practice on the sample of graph paper 120. The sample of graph paper may be photocopied, when blank, or filled with multiplication problems, to be utilized by a plurality of students, or by a single student repeatedly.

Moreover, the graph paper 120 may further have other indicia marked thereon to aid a user in completing a multiplication problem. As noted above, the shaded areas 122-132 may provide an area where a user multiplies numbers together. Additionally, a box may be marked on the graph paper 120 to aid a user in knowing what to do with the numbers that are generated by the steps of multiplication. As is known, when a user multiplies each column and places the resultant number in its respective row, these numbers are added together to arrive at the solution. Thus, a box may be marked (not shown) on the graph paper 120 to alert the user to add the numbers generated using the multiplication methodology. Of course, any other indicia may be contained on the graph paper 120 as apparent to one of ordinary skill in the art.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for teaching mathematics comprising:
a sheet having a multiplication problem thereon, wherein the multiplication problem has at least a first number having two or more digits including at least a tens digit to be multiplied by a second number having two or more digits including at least a tens digit, the ones digit of the first number vertically aligned with the ones digits of the second number, and wherein the sheet includes space below the first and second number for calculating solutions to the multiplication problem; and
a multiplication aid apparatus configured to be removably disposed on top of the multiplication problem on said sheet to focus a students' attention on a particular digit, said multiplication aid apparatus having a flat main body portion, wherein the main body portion has a front face, a back face, a left side and a right side, a first arm comprising a t-shape extending from the left side of the flat main body portion, wherein the first arm is configured to be positioned over at least one digit of the second number such that only a single digit of the second number is exposed while fully covering a first calculated solution of the first number multiplied by the ones digit of the second number, in the space below the first number, and a second arm comprising a rectangular-shape disposed below the first arm, wherein the second arm extends from the left side of the flat main body portion such that the second arm fully covers a second calculated solution of the first number multiplied by the tens digit of the second number, in the space below the first calculated solution, and is hingedly connected to the left side of the flat main body portion, such that hingedly moving the second arm disposes the second arm across the flat main body portion and exposes the second calculated solution of the first number multiplied by the tens digit of the second number, below the multiplication problem to aid in the multiplication problem.

2. The system of claim 1 wherein the multiplication aid further comprises a third arm disposed below the second arm, wherein the third arm extends from the left side of the flat main body portion and is hingedly connected to the left side of the flat main body portion such that hingedly moving the third arm disposes the third arm across the flat main body portion and exposes a third space to aid in the multiplication problem.

3. The system of claim 2 wherein the multiplication aid further comprises a fourth arm disposed below the third arm, wherein the fourth arm extends from the left side of the flat main body portion and is hingedly connected to the left side of the flat main body portion such that hingedly moving the fourth arm disposes the fourth arm across the flat main body portion and exposes a fourth space to aid in the multiplication problem.

4. The system of claim 1 wherein the sheet is a vertically-disposed rigid board, and further wherein the multiplication aid further comprises a linking device on the second arm, wherein the linking device holds the second arm across the flat main body portion and on the sheet when hingedly moved.

5. The system of claim 4 wherein the linking device is selected from the group consisting of a magnet, a suction cup, a hook-and-loop fastener and adhesive.

6. The system of claim 4 wherein the multiplication aid further comprises an attaching means for attaching the multiplication aid vertically to a flat board.

7. The system of claim 6 wherein the attaching means is selected from the group consisting of a magnet, a suction cup, a hook-and-loop fastener and adhesive.

8. The system of claim 6 wherein the linking device is a first magnet and the attaching means is a second magnet, and further wherein the rigid board is a magnet board.

9. The system of claim 8 wherein the first magnet is disposed on a front of the second arm when the second arm is in an unfolded state, and the second magnet is disposed on a rear face of the flat main body portion.

10. The system of claim 6 wherein the linking device is a first suction cup and the attaching means is a second suction cup, and rigid board has a surface able to hold the first and second suction cups.

* * * * *